United States Patent [19]

Nishimura et al.

[11] Patent Number: 5,689,298
[45] Date of Patent: Nov. 18, 1997

[54] METHOD AND APPARATUS FOR MULTIPLE READOUT OF DIGITAL VIDEO DATA WITH FASTER PLAYBACK MODE SWITCHING

[75] Inventors: Kazutoshi Nishimura, Tokyo; Yutaka Ishibashi, Aichi-ken; Tatsuo Mori, Chiba-ken, all of Japan

[73] Assignee: Nippon Telegraph & Telephone Corporation, Tokyo, Japan

[21] Appl. No.: 157,615

[22] Filed: Nov. 24, 1993

[30] Foreign Application Priority Data

Nov. 26, 1992 [JP] Japan .................. 4-317062

[51] Int. Cl.[6] .................................................. H04N 7/173
[52] U.S. Cl. .................. 348/7; 348/10; 348/12; 348/13; 455/3.1; 455/5.1; 386/46
[58] Field of Search ....................... 358/335, 312; 370/95.3; 360/33.1, 10.1; 348/6, 7, 10, 12, 13; 386/46; 455/3.1, 3.2, 4.1, 4.2, 5.1; H04N 5/76, 7/173

[56] References Cited

U.S. PATENT DOCUMENTS

| | | | |
|---|---|---|---|
| 3,961,139 | 6/1976 | Bowman et al. | 370/85.7 |
| 5,012,334 | 4/1991 | Etra | 358/311 |
| 5,257,352 | 10/1993 | Yamamoto et al. | 395/425 |
| 5,353,285 | 10/1994 | Van Der Plas et al. | 370/95.3 |
| 5,473,362 | 12/1995 | Fitzgerald et al. | 348/7 |
| 5,515,379 | 5/1996 | Crisler et al. | 370/85.6 |

OTHER PUBLICATIONS

Nishimura, K.; Mori, T.; Ishibashi, Y.; Sakurai, N.; *System Architecture For Digital Video–On–Demand Services*; Proceedings Of The 2nd Singapore International Conference On Image Processing; 7–11 Sep. 1992, Singapore, pp. 602–606.

*Primary Examiner*—Khoi Truong
*Attorney, Agent, or Firm*—Banner & Witcoff, Ltd.

[57] ABSTRACT

A multiple readout of digital video data, capable of realizing the fast forward and fast reverse modes even under the logically multiplexed circumstances, and reducing a time required for the playback mode switching. A cycle for a readout operation is formed by a plurality of slots, each slot representing a unit time for reading a unit amount of the digital video data for each channel assigned to each user terminal; at least one of the plurality of slots forming each cycle is allocated to each channel and at least one of the plurality of slots not yet used for any channel in each cycle is additionally allocated to a user terminal which is requesting a playback mode switching; and the readout operation to read the digital video data for each channel from the storage device is carried out at every slot allocated to each channel in each cycle, by cyclically repeating the cycle for the readout operation. The requested playback mode switching can be a switching to a fast forward/reverse mode.

14 Claims, 6 Drawing Sheets

METHOD AND APPARATUS FOR MULTIPLE READOUT OF DIGITAL VIDEO DATA WITH FASTER PLAYBACK MODE SWITCHING

BACKGROUND OF THE INVENTION

1. Field of the Invention

The present invention relates to a multiple readout of digital video data suitable for visual search functions such as fast forward, fast reverse, pause, still forward, still reverse, slow forward, slow reverse, reverse, and jump (random access) modes in a video-on-demand system in which a desired one of the digital video data stored in a storage unit at a center is read out and transferred to a user terminal for the display in response to the user's request.

2. Description of the Background Art

Figure 1:
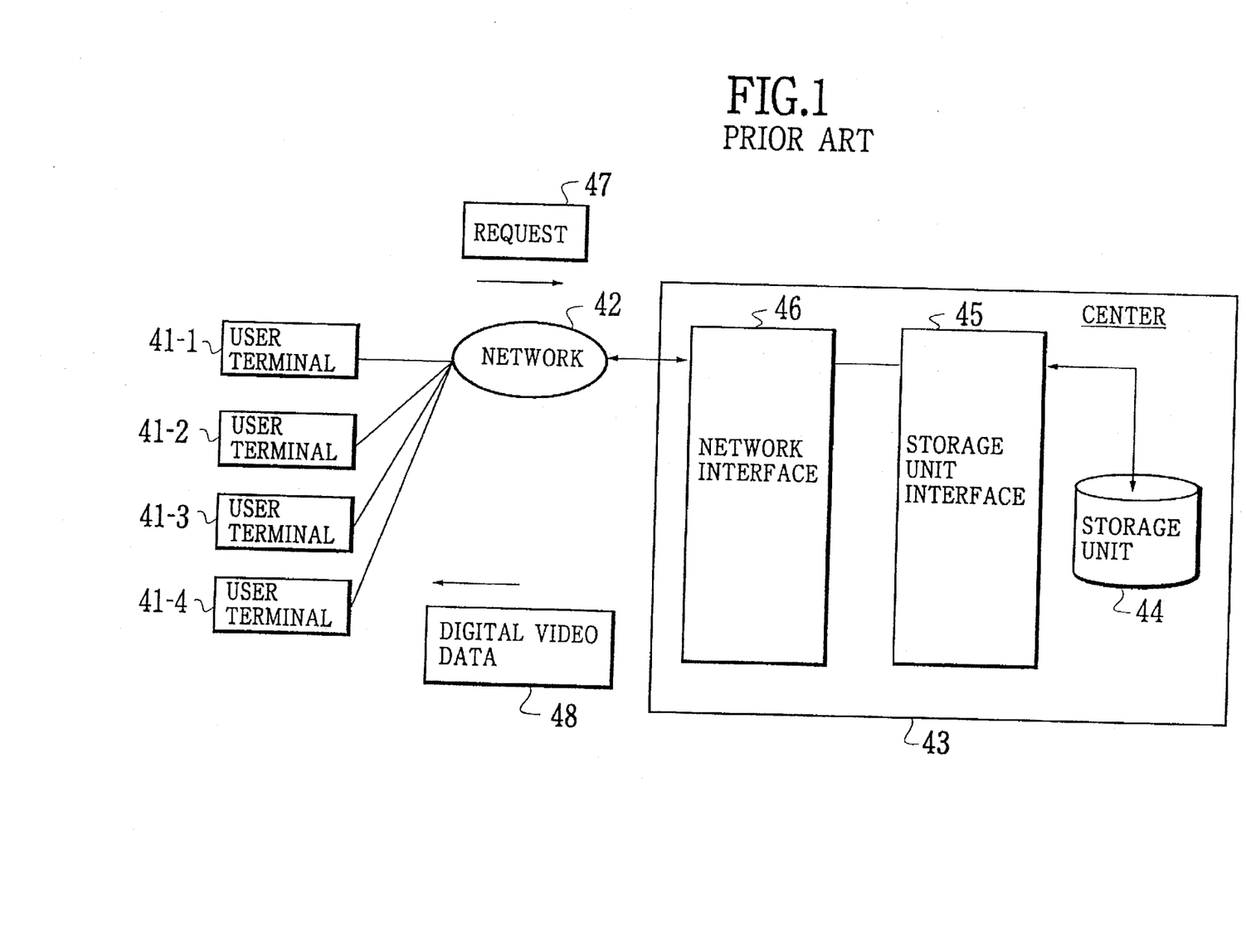
FIG. 1 is a schematic block diagram of a conventional video-on-demand system.

A conventional video-on-demand system has a typical configuration as shown in FIG. 1, in which a plurality of user terminals, 41-1, 41-2, 41-3, and 41-4, that etc. are connected to a center 43 through a network 42, where the center 43 comprises a storage unit 44 such as a magnetic disk for storing the digital video data, a storage unit interface 45 for controlling accesses to the storage unit 44, and a network interface 46 for controlling connections of the center 43 with the network 42.

In this video-on-demand system of FIG. 1, a request 47 can be transferred from the user terminal 41-1 to the center 43 through the network 42, for example. Then, the center 43 receives this request 47 through the network interface 46, and the digital video data 48 requested by this request 47 are read out from the storage unit 44 through the storage unit interface 45 and transferred to the user terminal 41-1 such that the desired video data can be decoded and displayed at the user terminal 41-1 in response to the user's request 47. Here, it is also possible to form a so called stand-alone type system in which some user terminals 41-1, 41-2, 41-3, 41-4, etc. may be directly connected with the center 43, without using the network 42.

In such a conventional video-on-demand system, the storage unit interface 45 carried out the digital video data readout operation in such a manner that a cycle in time is formed from a predetermined number of slots and each slot is fixedly allocated to a corresponding channel according to its slot position in each cycle, such that a high speed data readout of the digital video data 48 from the storage unit 44 can be carried out in units of a prescribed amount of data within each slot and the read out digital video data 48 can be transferred to the user terminal 41 and decoded and displayed thereon over one cycle.

More specifically, this digital video data readout operation is carried out according to the timing chart of FIG. 2 as follows.

Figure 2:
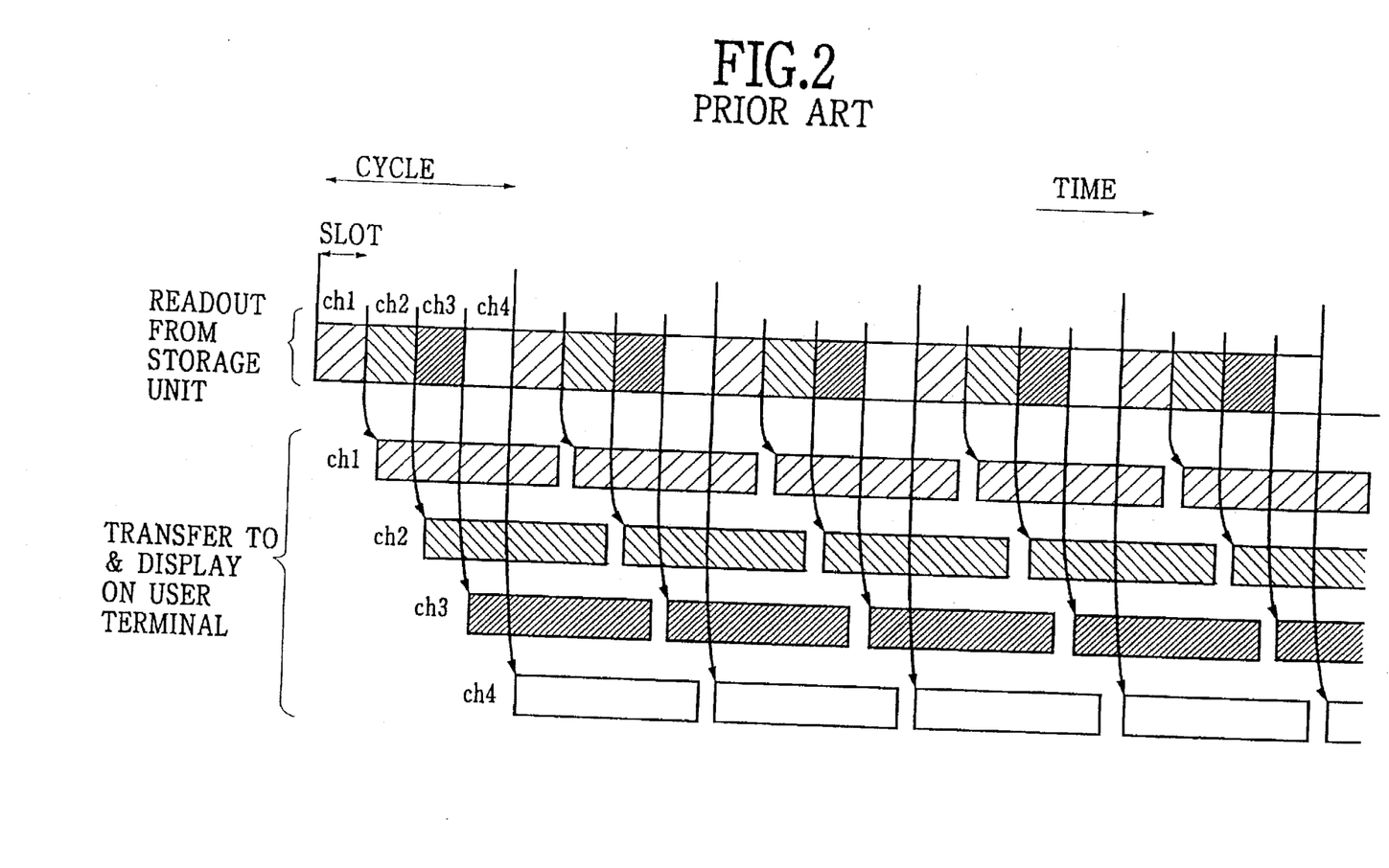
FIG. 2 is a timing chart for a conventional digital video data readout operation.

Namely, FIG. 2 shows an exemplary case of having four user terminals 41-1, 41-2, 41-3, and 41-4 are connected with the center 43 as in FIG. 1, in which each user terminal is assigned with a channel (ch1, ch2, ch3, and ch4, respectively). In this case, one cycle is formed by four slots corresponding to four channels as indicated in FIG. 2, and the digital video data readout operation is carried out for each of these four slots cyclically in each cycle. In FIG. 2, the time specified along a horizontal axis indicates a time seen from the storage unit interface 45 in the configuration of FIG. 1. This digital video data readout scheme of FIG. 2 is based on the fact that the decoding and displaying at the user terminal 41 requires more time than the readout from the storage unit 44.

However, such a conventional digital video data readout scheme has a drawback in that an amount of data that can be read out from the storage unit 44 within each slot is limited such that the visual search function such as the fast forward and fast reverse modes cannot be provided under the logically multiplexed circumstances, as each slot is fixedly allocated to a predetermined channel and used only cyclically in units of cycles.

Moreover, in a case a number of logically multiplexing is large and a cycle length is long, even when there is a playback mode switching request for switching to the visual search function such as the reverse mode or the jump mode in a certain channel, the switching to such visual search function cannot be executed until the slot assigned to that certain channel appears in the next cycle, so that the playback mode switching has been a considerably time consuming operation due to this waiting period.

SUMMARY OF THE INVENTION

It is therefore an object of the present invention to provide a method and an apparatus for multiple readout of digital video data, capable of realizing the fast forward and fast reverse modes even under the logically multiplexed circumstances, and reducing a time required for the playback mode switching.

According to one aspect of the present invention, there is provided a method for multiple readout of digital video data stored in a storage device, in response to requests from a plurality of user terminals, comprising the steps of: forming a cycle for a readout operation by a plurality of slots, each slot representing a unit time for reading a unit amount of the digital video data for each channel assigned to each user terminal; allocating at least one of said plurality of slots forming each cycle to each channel and additionally allocating at least one of said plurality of slots not yet used for any channel in each cycle to a user terminal which is requesting a playback mode switching; and carrying out the readout operation to read the digital video data for each channel from the storage device at every slot allocated to each channel at the allocating step in each cycle, by cyclically repeating the cycle for the readout operation formed at the forming step.

According to another aspect of the present invention there is provided an apparatus for multiple readout of digital video data stored in a storage device, in response to requests from a plurality of user terminals, comprising: means for forming a cycle for a readout operation by a plurality of slots, each slot representing a unit time for reading a unit amount of the digital video data for each channel assigned to each user terminal; means for allocating at least one of said plurality of slots forming each cycle to each channel and additionally allocating at least one of said plurality of slots not yet used for any channel in each cycle to a user terminal which is requesting a playback mode switching; and means for carrying out the readout operation to read the digital video data for each channel from the storage device at every slot allocated to each channel by the allocating means in each cycle, by cyclically repeating the cycle for the readout operation formed by the forming means.

Other features and advantages of the present invention will become apparent from the following description taken in conjunction with the accompanying drawings.

DETAILED DESCRIPTION OF THE PREFERRED EMBODIMENTS

Now, the embodiments of the method and apparatus for multiple readout of digital video data according to the present invention will be described in detail with references to the drawings.

In short, the multiple readout scheme according to the present invention takes advantage of the statistical multiplexing effect, based on the fact that the fast forward or fast reverse mode rarely are requested simultaneously in all channels, as follows.

On one hand, a spare slot for fast forward and fast reverse modes is provided in each cycle in addition to the slots assigned to the channels, such that when the user's request for the playback mode switching to the fast forward or fast reverse mode is made in a certain channel, the spare slot is allocated to the readout for the fast forward or fast reverse mode in addition to the slot corresponding to that certain channel. Here, more than one such spare slots may be provided for the purpose of realizing even faster fast forward or fast reverse mode, if desired.

On the other hand, when the user's request for the playback mode switching to the fast forward or fast reverse mode is made in a certain channel, any vacant slot which is not assigned to any channel is allocated to the readout for the fast forward or fast reverse mode in addition to the slot corresponding to that certain channel.

In addition, it is also possible to further increase a number of slots available to a channel requesting the fast forward or fast reverse mode by temporarily utilizing any vacant slot which is assigned to some channel but currently not in use. Such a vacant slot which is assigned to some channel but currently not in use can be expected to occur when that some channel is operated in any one of the slow forward mode, slow reverse mode, still forward mode, still reverse mode, and pause mode. In addition, this type of the vacant slot can also be expected to occur whenever the data readout operation is paused as the buffer in the center or the user terminal becomes full, in a case of transmitting the data from the center at the faster speed than the display speed at the user terminal, or in a case of reading out the data from the storage unit at the faster speed than the transmission speed from the center to the user terminal.

In other words, according to the present invention, a cycle for a readout operation is formed by a plurality of slots, each slot representing a unit time for reading a unit amount of the digital video data for each channel assigned to each user terminal, and at least one of the plurality of slots forming each cycle is allocated to each channel while at least one of the plurality of slots not yet used for any channel in each cycle is additionally allocated to a user terminal which is requesting a playback mode switching. Then, the readout operation to read the digital video data for each channel from the storage unit is carried out at every slot allocated to each channel in each cycle, by cyclically repeating the cycle for the readout operation.

In this manner, in the present invention, it becomes possible to provide a method and an apparatus for multiple readout of digital video data, capable of realizing the fast forward and fast reverse modes even under the logically multiplexed circumstances, while at the same time reducing a time required for the playback mode switching.

Figure 3:
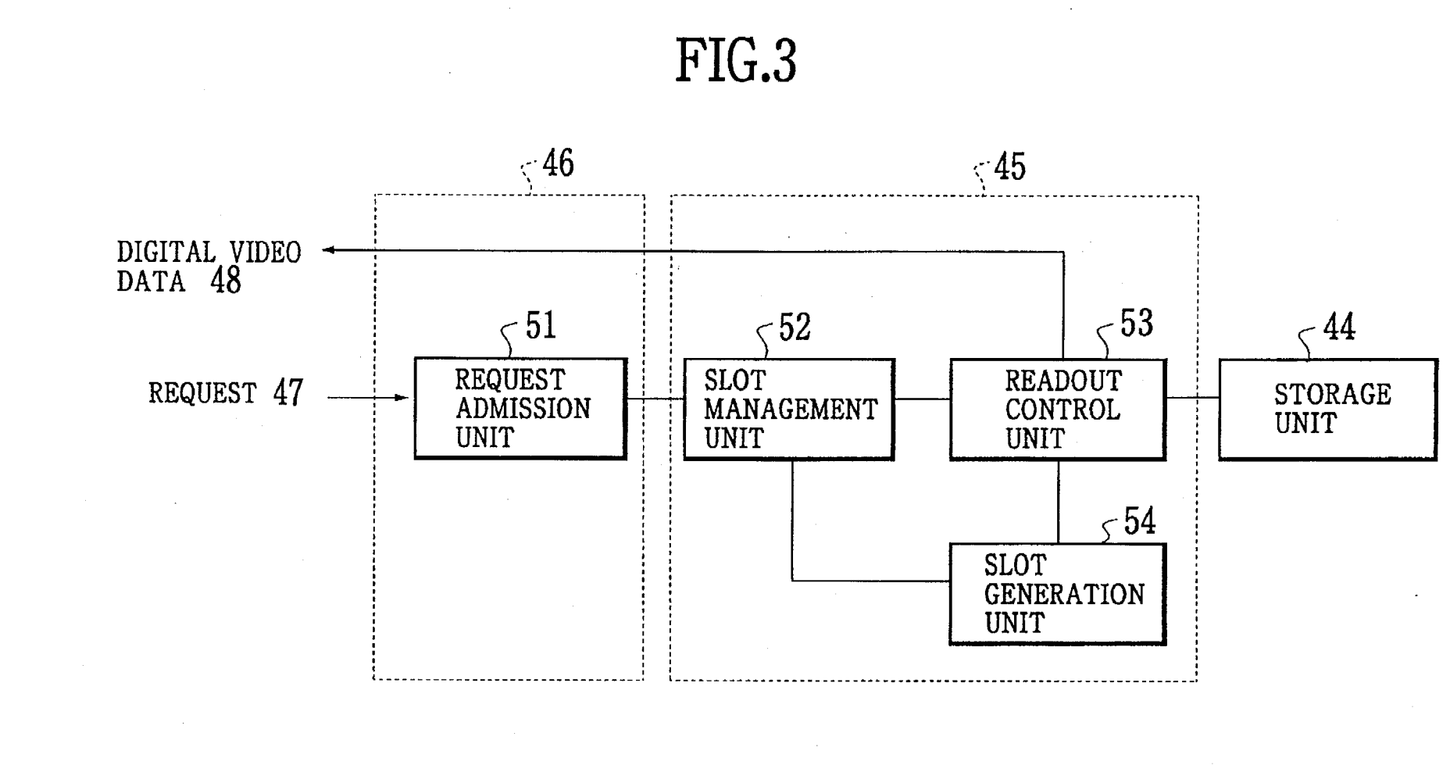
FIG. 3 is a schematic block diagram of one embodiment of an apparatus for multiple readout of digital video data according to the present invention.

Referring now to FIG. 3, one embodiment of the apparatus for multiple readout of digital video data according to the present invention will be described in detail.

In this embodiment of FIG. 3, the overall configuration of the video-on-demand system similar to that shown in FIG. 1 described above is also used. Here, however, according to the present invention as summarized above, the center contains a configuration as shown in FIG. 3, which comprises a request admission unit 51 for receiving the request 47 transmitted from the user terminal, a slot management unit 52 connected with the request admission unit 51 for managing the slots to be used in the readout operation by allocating a slot to each request received at the request admission unit 51 in each cycle, a readout control unit 53 connected with the storage unit 44 and the slot management unit 52 for carrying out the readout operation with respect to the storage unit 44 by using the slots managed by the slot management unit 52 and transferring the readout digital video data 48 to the user terminal, and a slot generation unit 54 connected with the slot management unit 52 and the readout control unit 53 for generating the slots to be managed by the slot management unit 52 and used by the readout control unit 53, including the spare slot to be used in the readout operation. As indicated in FIG. 3, the request admission unit 51 belongs to the network interface 46, while the slot management unit 52, the readout control unit 53, and the slot generation unit 54 belong to the storage unit interface 45.

Using this configuration of FIG. 3, one embodiment of the method for multiple readout of digital video data according to the present invention is carried out according to the timing chart of FIG. 4, as follows.

Figure 4:
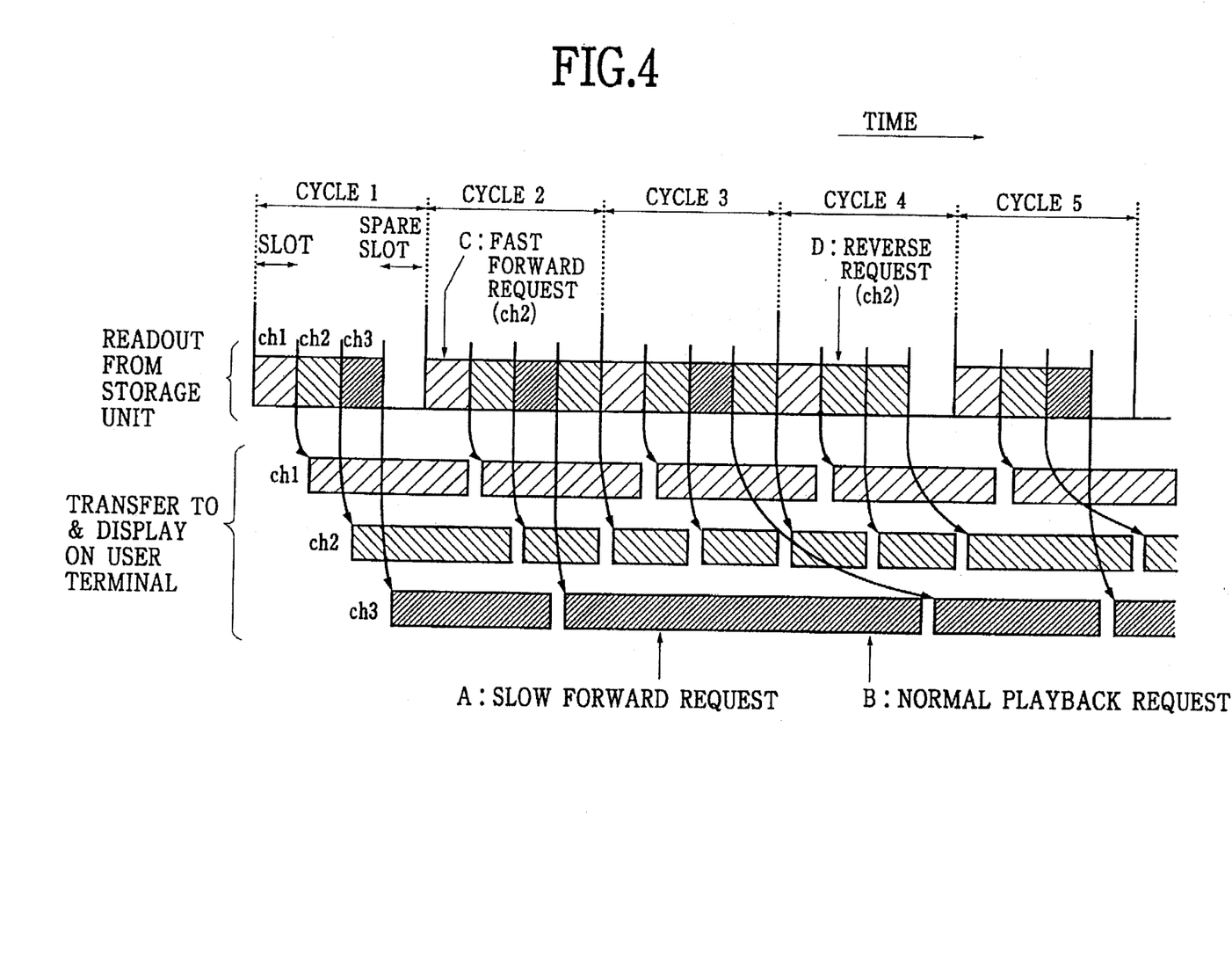
FIG. 4 is a timing chart for one embodiment of a method for multiple readout of digital video data according to the present invention.

Namely, FIG. 4 shows an exemplary case of having three user terminals connected with the center, in which each user terminal is assigned with a channel (ch1, ch2, and ch3). In this case, one cycle is formed by four slots, of which first three slots corresponds to three channels ch1, ch2, and ch3, while the last slot is the spare slot reserved for the fast forward and fast reverse modes, as indicated in FIG. 4. These slots are generated by the slot generation unit 54 and allocated as described above by the slot management unit 52 in correspondence to the requests received at the request admission unit 51. Then, the digital video data readout operation is carried out by the readout control unit 53 for each of these four slots cyclically in each cycle as follows.

In this exemplary case of FIG. 4, the channel ch1 is operated in the normal playback mode, while the channel ch2 makes the mode switching from the normal playback mode to the fast forward mode at the cycle 2 and the mode switching from the fast forward mode to the reverse mode at the cycle 4, and the channel ch3 makes the mode switching from the normal playback mode to the slow forward mode at the cycle 3 and the mode switching from the slow forward mode to the normal playback mode at the cycle 4.

In the channel ch1, at the first slot in the cycle 1, the high speed readout of the digital video data 48 from the storage unit 44 is carried out by the readout control unit 53 and the readout digital video data 48 is subsequently transferred to the user terminal assigned with the channel ch1. This transfer of the readout digital video data 48 to the user terminal is completed before the end of the first slot in the next cycle 2. During this data transfer, the high speed readout of the next digital video data 48 from the storage unit 44 is also carried out in parallel, at the first slot of the cycle 2. The next digital video data 48 read out at the cycle 2 is also subsequently transferred to the user terminal assigned with the channel ch1, similarly to the digital video data 48 read out at the cycle 1. Thereafter, in this channel ch1, the normal playback mode is continued in a similar manner, without being affected by the operations in the other channels.

As for the channel ch3, the high speed readout of the digital video data 48 from the storage unit 44 and the transfer of the readout digital video data 48 to the user terminal assigned with the channel ch3 are carried out at the cycle 1 and the cycle 2, similarly to the channel ch1 described above, but by using the third slot in each cycle.

Then, during the cycle 3, a mode switching request A for switching from the normal playback mode to the slow forward mode is received. In response, the transfer of the digital video data read out at the third slot in the cycle 2 is prolonged by means of the flow control, up to the fourth slot in the cycle 4. As a result, at the cycle 4, the transfer of the digital video data read out at the cycle 3 is not yet carried out, so that there is no need to carry out the readout of the digital video data at the third slot in the cycle 4, and consequently, this third slot in the cycle 4 can be regarded as vacant. In addition, a mode switching request B for switching back to the normal playback mode is received during the cycle 4, such that the normal playback mode similar to the channel ch1 is resumed from the cycle 5 on. Thus, this channel ch3 is an example of a case in which the mode switching can be realized by using only the slots allocated to itself.

On the other hand, the channel ch2 shows an example of a case in which the mode switching to the fast forward mode is realized by utilizing the spare slot reserved for the fast forward and fast reverse modes, and then the mode switching to the reverse mode is realized by utilizing the unused third slot in the cycle 4 due to the slow forward mode in the channel ch3 as described above as the vacant slot.

Namely, in this channel ch2, the high speed readout of the digital video data 48 from the storage unit 44 and the transfer of the readout digital video data 48 to the user terminal assigned with the channel ch2 are carried out at the cycle 1, similarly to the channel ch1 described above, but by using the second slot in each cycle.

Then, during the cycle 2, a mode switching request C for switching from the normal playback mode to the fast forward mode is received. In response, the high speed readout of the digital video data 48 from the storage unit 44 is carried out twice in this cycle 2, by using the second slot allocated to this channel ch2 as well as the fourth slot which is the spare slot. The transfer of the digital video data read out at these second and fourth slots in the cycle 2 is carried out at the doubly fast transfer speed, by thinning out an appropriate number of frames at a time of the transfer to the user terminal assigned with the channel ch2. This fast forward mode is continued up to the cycle 4.

Next, during the cycle 4, a mode switching request D for switching from the fast forward mode to the reverse mode is received. In response, the high speed readout of the digital video data 48 from the storage unit 44 is carried out twice in this cycle 4, by using the second slot allocated to this channel ch2 as well as the third slot which is the unused slot originally allocated to the channel ch2 that can be regarded as the vacant slot. The transfer of the digital video data read out at the second slot in the cycle 4 prior to the reception of the mode switching request D is carried out at the doubly fast transfer speed, while the transfer of the digital video data read out at the third slot in the cycle 4 after the reception of the mode switching request D is carried out at the normal transfer speed.

In this manner, in this embodiment, the mode switching operation can be realized much quickly compared with the conventional scheme described above in conjunction with FIG. 2 in which case the mode switching operation in response to the mode switching request D cannot be executed until the second slot in the next cycle 5.

It is to be noted here that, by increasing the number of the spare slots reserved for the fast forward and fast reverse modes, it is also possible to increase a number of channels that can carry out either one of the fast forward or fast reverse modes simultaneously, and/or the transfer speed for the digital video data read out in each channel in the fast forward or fast reverse mode.

Figure 5:
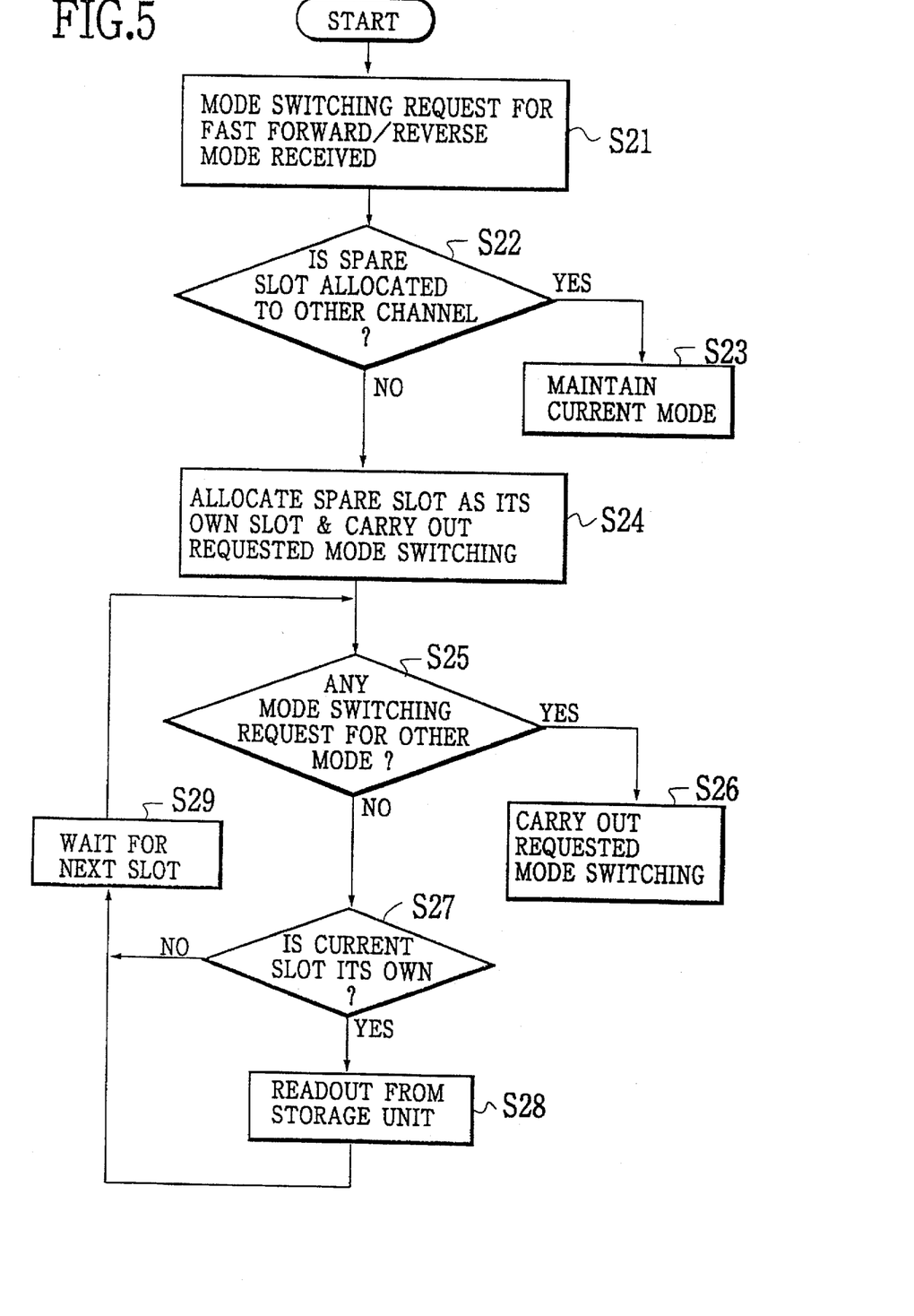
FIG. 5 is a flow chart for a mode switching operation using a spare slot in one embodiment of a method for multiple readout of digital video data according to the present invention.

Thus, in this embodiment, the mode switching operation using a spare slot, such as that in response to the request C in the channel ch2, proceeds according to the flow chart of FIG. 5, as follows.

First, at the step S21, the mode switching request for switching to either one of the fast forward and fast reverse modes is received.

Then, at the step S22, whether the spare slot reserved for the fast forward and fast reverse modes has already allocated to the other channel or not is judged. Alternatively, whether there is any slot which is not allocated to the other channel or not may be judged at this step S22.

When the spare slot has already been allocated to the other channel or there is no slot which is not allocated to the other channel at the step S22, the request for the mode switching to either one of the fast forward and fast reverse modes cannot be accepted, so that next at the step S23, the current mode is maintained without making any mode switching.

Otherwise, the request for the mode switching to either one of the fast forward and fast reverse modes is accepted, and next at the step S24, the spare slot or the slot which is not allocated to the other channel is allocated to its own channel as its own slot. Here, depending on the desired fast forward or fast reverse speed to be realized, more than one spare slots may be allocated, if possible. Then, the requested mode switching to the fast forward or fast reverse mode is carried out by using all the slots allocated to its own channel.

Then, at the step S25, whether there is a mode switching request for switching from either one of the fast forward and fast reverse modes to the mode other than these or not is judged.

When there is such a mode switching request, the requested switching to the mode other than the fast forward and fast reverse modes is carried out at the step S26.

Otherwise, next at the step S27, whether the current slot is a slot allocated to its own channel or not is judged.

When the current slot is its own slot, next at the step S28, the readout of the digital video data 48 from the storage unit 44 is carried out, and the next slot is awaited at the step S29. Then, the operation returns to the step S25 described above when the next slot appears.

When the current slot is not its own slot at the step S27, the operation directly proceeds to the step S29 described above.

Figure 6:
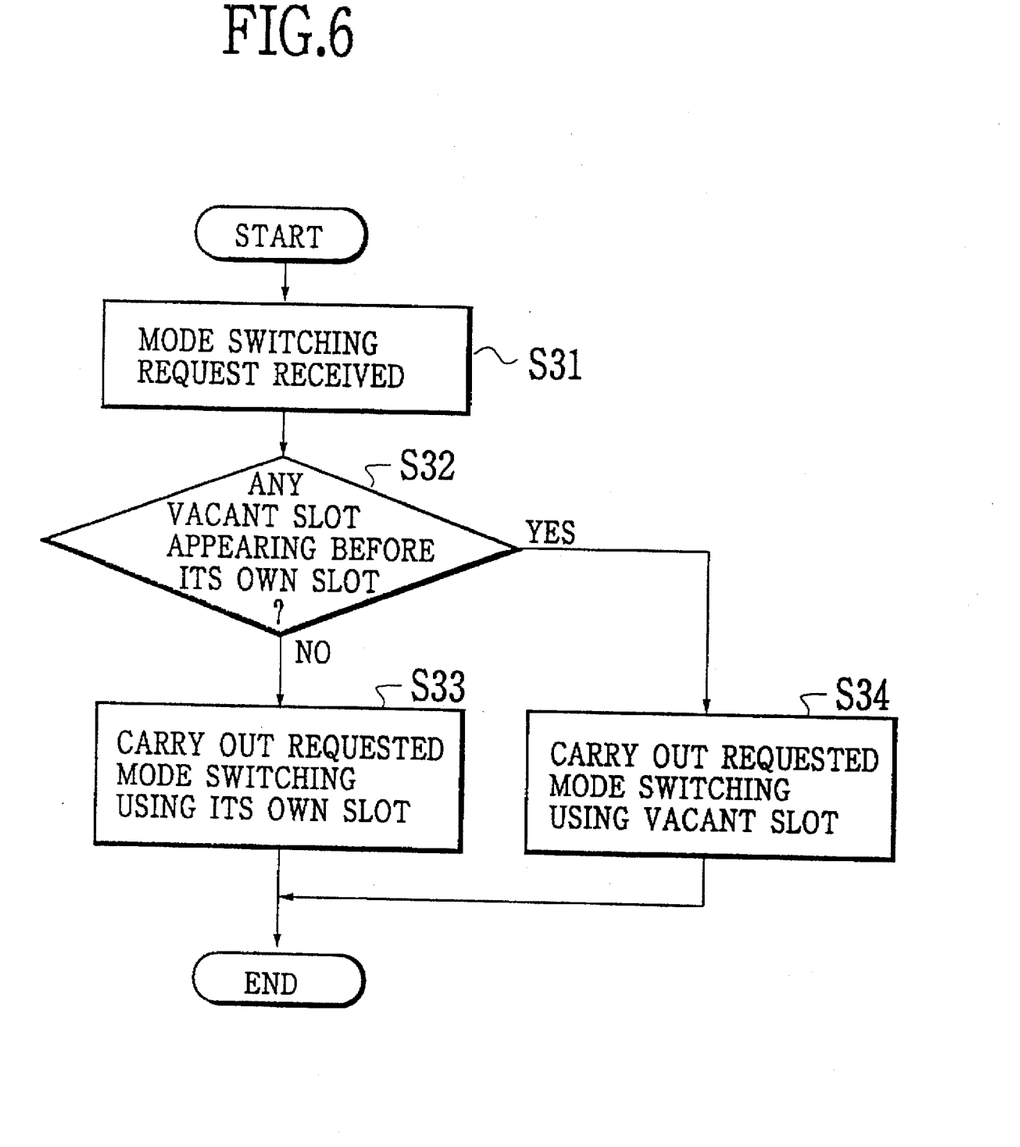
FIG. 6 is a flow chart for a mode switching operation using a vacant slot in one embodiment of a method for multiple readout of digital video data according to the present invention.

On the other hand, in this embodiment, the mode switching operation using a vacant slot, such as that in response to the request D in the channel ch2, generally proceeds according to the flow chart of FIG. 6, as follows.

First, at the step S31, the mode switching request is received.

Then, at the step S32, whether any vacant slot is appearing before its own slot, i.e., the slot allocated to its channel, appears next or not is judged.

When there is no vacant slot which is appearing before its own slot appears next at the step S32, the next appearance of its own slot is awaited and the requested mode switching is carried out by using its own slot at the step S33, whereas when there is a vacant slot which is appearing before its own slot appears next at the step S32, the requested mode switching is carried out by temporarily allocatinrg the vacant slot that is appearing before its own slot to its channel at the step S34, without waiting for the next appearance of its own slot.

In this manner, the time required for the mode switching operation can be reduced further.

As described, according to this embodiment, it becomes possible to provide a method and an apparatus for multiple readout of digital video data, capable of realizing the fast forward and fast reverse modes even under the logically multiplexed circumstances, and reducing the time required for the playback mode switching.

It is to be noted that the slots in each cycle may not necessarily be allocated to the channels in advance as in the embodiment described above, and can be made such that any channel can start utilizing as many slots as necessary and available, starting from the earliest available slot in each cycle.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for multiple readout of digital video data stored in a storage device, in response to requests from a plurality of user terminals, comprising the steps of:

forming a cycle for a readout operation by a plurality of slots, each slot representing a unit time for reading a unit amount of the digital video data for each channel assigned to each user terminal;

allocating at least one of said plurality of slots forming each cycle to each channel and additionally allocating at least one of said plurality of slots not yet used for any channel in each cycle to a user terminal which is requesting a playback mode switching; and carrying out the readout operation to read the digital video data for each channel from the storage device at every slot allocated to each channel at the allocating step in each cycle, by cyclically repeating the cycle for the readout operation formed at the forming step.

2. The method of claim 1, wherein at the allocating step, the user terminal which is requesting the playback mode switching requests a switching to a fast forward/reverse mode.

3. The method of claim 2, wherein said at least one of said plurality of slots to be additionally allocated at the allocating step is at least one spare slot reserved for the fast forward/reverse mode provided in each cycle in advance.

4. The method of claim 2, further comprising the step of continually allocating at least one of said plurality of slots not used for any channel in each cycle to the user terminal which requested the playback mode switching and subsequently continues to request the fast forward/reverse mode after the playback mode switching.

5. The method of claim 1, wherein said at least one of said plurality of slots to be additionally allocated at the allocating step is at least one vacant slot not yet allocated to any channel in each cycle.

6. The method of claim 1, wherein said at least one of said plurality of slots to be additionally allocated at the allocating step is at least one vacant slot allocated in advance to some channel but not used in the readout operation for said some channel.

7. The method of claim 1, further comprising the steps of:

transferring the digital video data for each channel read out at the reading step to each user terminal assigned with each channel; and decoding and displaying the digital video data transferred at the transferring step on each user terminal.

8. An apparatus for multiple readout of digital video data stored in a storage device, in response to requests from a plurality of user terminals, comprising:

means for forming a cycle for a readout operation by a plurality of slots, each slot representing a unit time for reading a unit amount of the digital video data for each channel assigned to each user terminal;

means for allocating at least one of said plurality of slots forming each cycle to each channel and additionally allocating at least one of said plurality of slots not yet used for any channel in each cycle to a user terminal which is requesting a playback mode switching; and means for carrying out the readout operation to read the digital video data for each channel from the storage device at every slot allocated to each channel by the allocating means in each cycle, by cyclically repeating the cycle for the readout operation formed by the forming means.

9. The apparatus of claim 8, wherein the user terminal which is requesting the playback mode switching requests a switching to a fast forward/reverse mode.

10. The apparatus of claim 9, wherein said at least one of said plurality of slots to be additionally allocated by the allocating means is at least one spare slot reserved for the fast forward/reverse mode provided in each cycle in advance.

11. The apparatus of claim 9, further comprising means for continually allocating at least one of said plurality of slots not used for any channel in each cycle to the user terminal which requested the playback mode switching and subsequently continues to request the fast forward/reverse mode after the playback mode switching.

12. The Apparatus of claim 8, wherein said at least one of said plurality of slots to be additionally allocated by the allocating means is at least one vacant slot not yet allocated to any channel in each cycle.

13. The apparatus of claim 8, wherein said at least one of said plurality of slots to be additionally allocated by the allocating means is at least one vacant slot allocated in advance to some channel but not used in the readout operation for said some channel.

14. The apparatus of claim 8, further comprising means for transferring the digital video for each channel read out by the carrying out means to each user terminal assigned with each channel, wherein each user terminal decodes and displays the digital video data transferred thereto by the transferring means.

* * * * *